(12) United States Patent
Schamin et al.

(10) Patent No.: US 12,287,009 B2
(45) Date of Patent: Apr. 29, 2025

(54) ROLLING BEARING APPARATUS

(71) Applicant: Schaeffler Technologies AG & Co. KG, Herzogenaurach (DE)

(72) Inventors: Alexander Schamin, Oberasbach (DE); Sebastian Giehl, Burgebrach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/020,712

(22) PCT Filed: Jul. 8, 2021

(86) PCT No.: PCT/DE2021/100595
§ 371 (c)(1),
(2) Date: Feb. 13, 2023

(87) PCT Pub. No.: WO2022/037743
PCT Pub. Date: Feb. 24, 2022

(65) Prior Publication Data
US 2024/0183402 A1 Jun. 6, 2024

(30) Foreign Application Priority Data

Aug. 19, 2020 (DE) ............. 10 2020 121 735.8

(51) Int. Cl.
*F16C 41/00* (2006.01)
*F16C 19/06* (2006.01)
(Continued)

(52) U.S. Cl.
CPC ............ *F16C 41/002* (2013.01); *F16C 19/06* (2013.01); *F16C 33/586* (2013.01);
(Continued)

(58) Field of Classification Search
CPC ......... F16C 41/002; F16C 19/52; H02K 11/40
See application file for complete search history.

(56) References Cited

U.S. PATENT DOCUMENTS 3,564,477 A 2/1971 Pompei
6,215,215 B1 4/2001 Huber
(Continued)

FOREIGN PATENT DOCUMENTS

CN 105580218 A 5/2016
CN 107690746 A 2/2018
(Continued)

*Primary Examiner* — James Pilkington
*Assistant Examiner* — Aimee Tran Nguyen
(74) *Attorney, Agent, or Firm* — Matthew V. Evans

(57) ABSTRACT

A rolling bearing apparatus includes a rolling bearing, a seal, first and second machine elements and a bypass apparatus. The rolling bearing includes a concentrically arranged first bearing ring and second bearing ring, and rolling elements arranged radially between the first bearing ring and the second bearing ring. The seal is arranged radially between the first bearing ring and the second bearing ring, and the second bearing ring is installed in the first machine element. The bypass apparatus forms an electrical connection between the first machine element and the second machine element. The bypass apparatus includes an electrically conductive bypass line and a holder connected to the electrically conductive bypass line in an electrically conductive manner. The holder is fastened to the second bearing ring radially between the second bearing ring and the first machine element.

16 Claims, 7 Drawing Sheets

(51) Int. Cl.
*F16C 33/58* (2006.01)
*F16C 33/78* (2006.01)
*H02K 11/40* (2016.01)

(52) U.S. Cl.
CPC ...... *F16C 33/7846* (2013.01); *F16C 33/7886* (2013.01); *H02K 11/40* (2016.01); *F16C 2202/32* (2013.01); *F16C 2226/74* (2013.01); *F16C 2380/26* (2013.01)

(56) References Cited

U.S. PATENT DOCUMENTS

| | | | |
|---|---|---|---|
| 6,755,572 | B1 | 6/2004 | Kinbara |
| 2006/0233476 | A1 | 10/2006 | Bayer |
| 2011/0193446 | A1 | 8/2011 | Orlowski |
| 2015/0239661 | A1* | 8/2015 | Morris, III ............ B65D 90/46 361/220 |
| 2016/0111941 | A1 | 4/2016 | Sturm |
| 2017/0108047 | A1 | 4/2017 | White |
| 2019/0199180 | A1 | 6/2019 | Huber |
| 2021/0364041 | A1* | 11/2021 | Berruet ................ F16C 35/077 |

FOREIGN PATENT DOCUMENTS

| | | | | |
|---|---|---|---|---|
| CN | 109155573 | A | 1/2019 | |
| DE | 102013000982 | A1 | 7/2014 | |
| DE | 102015224044 | A1 | 10/2016 | |
| DE | 102015223509 | A1 | 3/2017 | |
| DE | 102016010926 | A1 | 9/2017 | |
| DE | 102017106695 | B3 | 4/2018 | |
| DE | 102018117315 | A1 | 1/2020 | |
| DE | 102014010269 | B4 | 6/2020 | |
| DE | 102019112825 | A1 * | 11/2020 | |
| DE | 102019133881 | A1 * | 6/2021 | ............. F16C 19/52 |
| JP | 2005069449 | A | 3/2005 | |
| JP | 2012097856 | A | 5/2012 | |
| JP | 2014240676 | A | 12/2014 | |
| JP | 2015207533 | A | 11/2015 | |
| KR | 20190088231 | A | 7/2019 | |
| WO | 2007065415 | A1 | 6/2007 | |
| WO | 2010145890 | A1 | 12/2010 | |
| WO | 2013011839 | A1 | 1/2013 | |
| WO | 2019131899 | A1 | 7/2019 | |
| WO | 2020001674 | A1 | 1/2020 | |
| WO | 2021115530 | A1 | 6/2021 | |

* cited by examiner

ROLLING BEARING APPARATUS

CROSS-REFERENCE TO RELATED APPLICATIONS

This application is the United States National Phase of PCT Appln. No. PCT/DE2021/100595 filed Jul. 8, 2021, which claims priority to German Application No. DE102020121735.8 filed Aug. 19, 2020, the entire disclosures of which are incorporated by reference herein.

TECHNICAL FIELD

The present disclosure relates to a rolling bearing apparatus which is formed at least from at least one rolling bearing, a seal and a bypass apparatus.

BACKGROUND

Rotor shafts in electrical machines are commonly mounted with rolling bearings. Unwanted voltage potentials often arise between the rotor shafts and housings of electric motors and generators. If no countermeasures are taken, these voltage potentials are discharged via the rolling bearings. The current flowing through the affected rolling bearing can generate sparks in the rolling contact between the rolling elements and the raceways. The rolling raceways are damaged by melt indentations or erosion indentations.

Measures are already known in professional circles to prevent the buildup of voltage potentials or the discharge of these voltage potentials via the rolling bearings. Bypass apparatuses are used, for example, by which discharges are guided "around" the rolling bearings of the electric motor in a bypass-like manner via so-called shaft grounding rings. DE 10 2016 010 926 A1 discloses a bypass apparatus of this type, which consists of a shaft grounding ring. This shaft grounding ring has a disc-shaped electrically conductive bypass line, which is clamped towards the housing between two conductive angle plates and which rests elastically preloaded on the inside against a shaft. The angle plates forming the holder of the bypass line are inserted into a housing at any suitable places. The bypass line is made of conductive material, which has a lower resistance to flowing currents than, for example, steel. The advantage of such a bypass apparatus is that the shaft grounding ring is simple and inexpensive to manufacture.

Bypass lines are also popular in professional circles for integration into sealing apparatuses. An example of a secondary seal designed as a bypass line is disclosed in DE 10 2014 010 269 B4. The secondary seal is connected in series with a main seal and, as a bypass line, also establishes an electrically conductive connection between two machine elements. The disc-shaped bypass line is also intended to protect the sealing lip of the main seal against contaminants from the environment and is fastened to the main seal. The main seal sits in the housing with a holder formed from an angle plate.

The sealing effect of sealing apparatuses is often increased by means of pre-seals when the rolling bearings may be heavily stressed by dirt in the environment. The pre-seal and the main seal are connected in series with regard to their effect, i.e. contamination from the environment of the rolling bearing first come into contact with the pre-seal. The main seal protects the inside of the bearing, i.e. the zones of rolling contact of the rolling elements with the raceways. In most cases, one main seal is arranged on the left and one on the right of the rolling raceways. The pre-seal is located upstream of the main seal in the direction of the outside environment of the rolling bearing and is usually intended to keep coarse contamination away from the main seal. There is often an intermediate space between the pre-seal and main seal due to an axial gap. When both seals are in sealing contact, pressure differences can occur between the air pressure of the environment of the sealing apparatus and that of the intermediate space. In the case of a cold or cooling rolling bearing and warmer ambient air, for example, there is a comparative negative pressure in the intermediate space. Since the pre-seal does not usually provide a hermetic pressure-tight seal, the negative pressure draws air from the environment into the intermediate space. In this process, humidity, liquids and dirt particles are unintentionally carried into the intermediate space and held therein. Over time, these contaminants, for example also due to pressure differences between the air pressures of the intermediate space and the zones of the rolling contact, get under the sealing lip of the main seal and into the zones of the rolling contact. The sealing lip of the main seal is damaged and contaminants enter the inside of the rolling bearing to be sealed and can damage it, for example by contaminating the lubricating grease. The secondary seal described in DE 10 2014 010 269 B4, which is designed as a bypass line, is also designed to be air-permeable to prevent such pressure differences.

In general, rolling bearing manufacturers are interested in using such bypass lines in the direct and immediate vicinity of the rolling bearings, which may be exposed to the damage described at the beginning due to the discharge of the voltage potentials. In addition, the bypass lines should be accommodated in the most space-saving way possible. This is why such bypass lines are integrated into the main seals of rolling bearings, for example. Such an apparatus is disclosed in DE 10 2015 240 44 A1. The main seal used in this apparatus is interspersed with conductive filler.

SUMMARY

According to the disclosure, it is provided that the holder is fastened radially between one of the bearing rings and one of the machine elements to the one of the bearing rings and holds the bypass line. The one of the bearing rings is seated in the one of the machine elements or on the one of the machine elements. The holder is seated, for example, on an outer ring radially between the outer ring and a housing or alternatively on an inner ring radially between the inner ring and a shaft.

The holder has one retaining ring or multiple retaining rings and one retaining washer or multiple retaining washers.

One embodiment provides that the retaining ring is provided externally with at least one, e.g., multiple retaining element(s) extending axially in the same direction as the axis of rotation between the housing and the one of the bearing rings. Here, the bypass line is held axially between the electrically conductive retaining ring and the retaining washer.

One or more bypass apparatuses are integrated into the rolling bearing apparatus. The bypass line is integrated into the rolling bearing and yet fastened to the rolling bearing in such a way that it is radially fixed in the bearing seat rather than inside the rolling bearing in a space-saving manner— i.e. on the outside of the rolling bearing between a housing or shaft or other machine elements and one of the bearing rings of the rolling bearing. No separate axial installation space is required for fastening the bypass line. The radial installation space is already available due to the dimensions of the rolling bearing. This has a particularly positive effect on the application in rolling bearing apparatuses with rolling bearings of small diameter ranges, in which there is little radial and axial installation space between the bearing rings for accommodating seals and bypasses. The limited space can be fully used to accommodate the seal and the bypass apparatus. The components for fastening the bypass line therefore do not have to be as delicately designed and can therefore often be manufactured at lower cost.

The rolling bearing apparatus has one rolling bearing or multiple rolling bearings. The rolling bearing is sealed from the environment or surrounding structure by one or multiple seals. The seal is arranged radially between the bearing rings, is of any design, has one or more sealing lips in contact with an inner ring or an outer ring, for example, and is seated in an outer ring or in an inner ring of the rolling bearing.

The seals concerned are one or multiple seals, e.g., designed as main seals, which seal the inside of the rolling bearing with the zones of the rolling contact, the rolling elements and, if necessary, with the cage to the outside. Main seals can be in tight contact or be gap or labyrinth seals. The seals have one or more sealing lips and are in full sealing contact with one of the bearing rings in one direction and are fastened to the other of the bearing rings in the other radial direction. Alternatively, the seals are fixed to the bearing ring in one radial direction and seal without contact in the other radial direction. In sealed rolling bearings, the seals are seated in axial directions to the left and right of the rolling elements and establish a sealed space in which the rolling elements move in the rolling contacts and cages.

The bypass apparatus is arranged on one side of the rolling elements following the seal in the axial direction so that an intermediate space is formed between the seal and the bypass apparatus.

At least one electrical connection at least between the first and second machine elements is formed via the bypass apparatus. It is therefore also conceivable that further electrically conductive connections between further machine elements are also formed permanently via the bypass apparatus or may even be switched on and off.

The bypass apparatus includes one or more holders and one or more electrically conductive bypass lines. According to the disclosure, the holder is seated in or on one of the bearing rings of the rolling bearing. It is therefore integrated in the rolling bearing or in the bearing seat of the rolling bearing and is seated either on the inner ring or on the outer ring. The holder is a component of any design, which is suitable for holding the bypass line in the rolling bearing.

The rolling bearing including the bypass apparatus is available as one structural unit from the manufacturer of the rolling bearing. Assembly time and storage space are saved both at the customer of the bearing manufacturer and at the bearing manufacturer itself. The properties of the bypass line can be exactly matched to the contact or discharge resistance of the rolling bearing.

The respective holder and the bypass line are connected to one another in an electrically conductive manner. The holder is itself conductive or the bypass line and the machine element are connected to one another via a separate electrical conductor, for example, via a conductive sleeve. In general, the bypass apparatus is designed such that voltage potentials discharge through this bypass apparatus and not through the rolling bearing.

The at least one rolling bearing is used to mount two machine elements so that they can rotate against one another. In this regard, one of the machine elements or the other machine element is mounted rotatably about the axis of rotation of the rolling bearing by means of the rolling bearing, or the one or other machine element is fixed to the housing. Alternatively, both machine elements are arranged to be rotatable relative to one another about the axis of rotation of the rolling bearing. Machine elements are shafts, for example rotor shafts of an electrical machine, housings, for example end shields or housings or housing sections or end shields of an electrical machine, gears or shafts or housings of a transmission or any other machine elements which are suitable for being mounted on or against one another by means of rolling bearings.

The axis of rotation of the rolling bearing is axially aligned in the cases considered, but can also extend in space with a horizontal or vertical as well as oblique orientation. The term "radial" means perpendicular and transverse to the axis of rotation.

The rolling bearing is used for the rotatable mounting of machine parts, elements and assemblies and, in order to reduce friction, has rolling elements which roll between the inner ring and the outer ring and thus reduce friction in the rotatable bearing. As already explained, the rolling bearing has an inner ring and an outer ring. Alternatively, the rolling bearing has more than one inner and or outer ring. Furthermore, the bearing rings are alternatively split and each have a raceway or a portion of a raceway. One or more outer raceways are usually formed on the inner ring and one or more inner raceways are formed accordingly on the outer ring. The rolling elements rolling on the raceways are either balls or rollers. The balls or rollers are often guided and held in cages. Rolling elements of a rolling bearing are either arranged in a row one behind the other in the circumferential direction or, alternatively, the rolling bearing has several rows of rolling elements arranged side by side. Rolling bearings are alternatively axial bearings. In this case, both the inner ring and the outer ring are the axial discs, which have axial raceways.

For the purposes of the disclosure, the bypass refers to the bypassing of a current or voltage around one or more rolling bearings and/or machine parts. The rolling elements and the bearing rings are usually made of rolling bearing steel and are in contact at the raceways. The contact zones formed here are potential passages for currents on which the feared discharges lead to the damage to the raceways already described in the BACKGROUND.

The bypass or bypass apparatus is intended to divert the currents. On the one hand, this can be "controlled" by the bypass apparatus or, in any case, the bypass line having comparatively lower electrical or specific electrical resistances compared to the rolling bearing.

Thus, one embodiment provides that the electrical resistance of the bypass line or apparatus is lower than or equal to 100 ohms, e.g., even lower than 10 ohms. This leads to the fact that the bypass line can be, for example, an electrical conductor made of copper, silver or their or other conductive metal alloys or carbon with a lower specific resistance of the individual materials than steel. On the other hand, it is conceivable that the rolling bearings are insulated against the passage of current. For example, it is conceivable that an insulator or insulation layer is applied between the bearing ring or bearing rings and the machine element on/in which the bearing ring is seated. In this case, the bypass only guides the discharges past the rolling bearing via the bypass elements of the bypass apparatus seated on the rolling bearing, but not through the rolling bearing. In this case, the holder sits on the insulated bearing ring, but has conductive contact with the machine element. For example, the holder sits on the outer ring and is preloaded against the housing in an elastically resilient manner. Or a sleeve sits on a shaft while the sleeve is not or yet in contact with the inner ring or outer ring. Alternatively or combined with other measures, it is also conceivable that the rolling elements are, for example, made of non-conductive material, such as ceramic. In this case, the bypass apparatus only has to divert the current.

As mentioned previously, the holder has one retaining ring or multiple retaining rings and one retaining washer or multiple retaining washers. One embodiment provides that the holder or retaining ring is provided with at least one, e.g., multiple, recesses distributed circumferentially about the axis of rotation of the rolling bearing and extending axially through a base body in a continuous manner, which extends substantially radially and is designed to be in the shape of an annular disc. The retaining washer engages in the recess with at least one retaining clip and is held on the base body. The bypass line is held axially between the electrically conductive retaining ring and the retaining washer. The retaining clip or retaining clips are latched or hooked into the recess in a form-fitting and/or force-fitting manner. Such an arrangement is easy to assemble. The individual parts of the holder can be manufactured inexpensively from sheet metal.

The present disclosure provides for the separation of the functions of the seal and the bypass line. In general, it can be assumed that the choice of material for a secondary seal according to the known state of the art involves compromises with regard to the requirements for a permanent sealing function or conductivity. The material of main seals with conductive fillers may suffer in regard to elasticity and wear resistance. In addition, such combined materials are relatively expensive compared to that of standard seals, and the stability of the injection molds used to manufacture them may be reduced due to the harder filler compared to that used to manufacture standard seals. In addition, the air permeability of secondary seals, for example, can be blocked in the event of heavy contamination, with the resulting negative consequences already described. In general, the recesses ensure adequate ventilation of the intermediate space formed between the bypass apparatus and the main seal.

Thus, the design of the bypass apparatus is focused exclusively on current conductivity and installation situation but not on a sealing function. When bypass lines are integrated into sealing systems, as mentioned at the beginning of the discussion on the state of the art, compromises must be made with regard to the choice of material properties of the seals and also of the bypass line. When designing the bypass line of a bypass apparatus according to the disclosure, it is only necessary to consider the requirements for current conductivity and wear resistance in the design and selection of material. The bypass line is formed from any pressure-tight material alternatively also from air-permeable material, for example with a fiber or fabric structure. Combinations or mixtures of various materials, layers and/or sections of various compositions of conductive materials or the interspersion or interweaving, weaving and/or stacking of conductive materials to form the bypass line are also provided. Even if the bypass line is made of pressure-tight material, however, the at least one axial recess in the bypass holder or bypass apparatus according to the disclosure guarantees a passage freely permeable to media from the environment in front of the bypass holder into the intermediate space.

With a further embodiment, it is provided that the retaining element or retaining ring has multiple brackets distributed around the circumference of the one of the bearing rings, or the retaining elements are such brackets. These brackets are arranged radially between the bearing ring and the machine element, for example between the outer ring and a housing or between the inner ring and a shaft, and axially overlap the bearing ring and radially engage behind the bearing ring here. The brackets are designed to be elastically resilient and radially preloaded between one of the machine elements and the one of the bearing rings against the one of the bearing rings.

The zones on the bearing ring to which the retaining ring is fastened or against which the retaining elements are preloaded against the bearing ring do not have to be finely machined, because the retaining elements are at least radially elastically preloaded against this zone. The elasticity of the individual retaining elements is ensured by the fact that they are separated from one another circumferentially about the axis of rotation of the rolling bearing by the axially continuous recesses. As a result, the retaining elements are extended from a base on the retaining ring by a radially extending elastic lever. In conjunction with a snap-on geometry, the retaining element can bridge large tolerances during pressing and is securely fixed axially as well as radially. The retaining rings are simple and inexpensive to manufacture from sheet metal or spring steel.

A further embodiment provides that one or more clamping elements or retaining clips formed on the retaining washer or separately, each or more than one, engage in one of the recesses and hold the retaining washer and retaining ring together in a form-fitting manner. In this regard, the bypass line is clamped axially between the clamping element and the holder or between the retaining washer and the retaining ring. The clamping element can, for example, be a simple bracket that is inserted into the recess, or the clamping element or the retaining clip are formed on the retaining ring of the holder. Clamping elements are releasably or non-releasably clamped to the retaining ring and retaining clips are, for example, clipped or snapped into the recesses in a form-fitting manner and can also be releasable again in certain circumstances.

With a further embodiment, it is provided that the holder rests against the one of the bearing rings in an electrically conductive manner in contact with the one of the bearing rings. The holder is made of electrically conductive material or has a conductive coating or conductive elements. Crucially, an electrically conductive connection is formed between the machine element and the holder either via the electrically conductive bearing ring or in direct contact with the holder. The bearing ring is made of a conductive material or has an electrically conductive coating. In general, it can be assumed in this case that the electrical resistance of the bypass apparatus case is lower than the electrical resistance in the passage through the rolling contacts of the rolling bearing.

The rolling contacts are the contacts against which the rolling elements rest against the raceways during operation or when the respective rolling bearing is at a standstill. The zones of rolling contact are thus the zones in which the rolling elements roll on the rolling raceways of the bearing rings during operation of the rolling bearing. The electrically conductive connection for discharging the voltage potentials between the first and second machine elements is established by means of the bypass apparatus. As mentioned at the beginning, the machine elements can be housings or shafts, alternatively also other machine parts. Thus, according to one embodiment, it is provided that the second machine element is the inner ring of the rolling bearing. It is therefore not excluded that at least one bearing ring of the rolling bearing is a conductive part of the bypass apparatus.

According to one embodiment, it is provided that the second machine element is a hollow cylindrical component. In this case, the hollow cylindrical component may be part of the bypass apparatus, for example if the rolling bearing with the bypass apparatus is prepared as a structural unit for assembly. The second bearing ring, which is designed as at least one inner ring, and the hollow cylindrical component are connected to one another. Transmission manufacturers often fight for every millimeter of installation space. This also has an impact on the requirements placed on the rolling bearings, which consequently have to be designed to save as much radial space as possible. In standard rolling bearings, however, a minimum cross-section of the bearing rings is required to absorb the stresses occurring in rolling contact. For example, radial minimum rib heights are required for ball or roller bearings. The height of the ribs, which rise radially above the respective rolling raceways at the sides, influences the radial dimension of the annular gap between the inner ring and outer ring. Due to these measures, the annular gap remaining may be too small for the installation of a bypass apparatus. In addition, a radial contact surface is required for contact of the bypass line with either a machine element or the bearing ring, on which the bypass line establishes the conductive transition contact between the machine element or the bearing ring. Therefore, either the bearing ring would have to be extended or the contact surface on the machine element would have to be prepared separately. In both cases, the effort is relatively high. However, if the machine element is a hollow cylindrical component that is either fastened to the bearing ring or sits on the machine element, this contact surface can be prepared on this hollow cylindrical component. In its simplest form, the hollow cylindrical component can be designed as a sleeve cut from a tube or wound or drawn from a sheet. The sleeve can then be fixed to one of the bearing rings and project axially beyond the other of the bearing rings without affecting the installation space required for the rolling bearing. Such a sleeve can be manufactured inexpensively and also provided with a conductive coating, for example. It is interchangeable with various versions of itself without the need to change the rolling bearing itself.

The sleeve saves radial installation space, so that more radial space is available for the bypass apparatus. In addition, the sleeve can be designed specifically as a conductive component, both in terms of its shape and the choice of materials, in a way that would not be possible with a bearing ring, for example—because in general, when designing and selecting materials for a bearing ring, the requirements for the load carrying capacity and service life of a rolling bearing must be given priority. In addition, special friction or sliding properties in the contact zone with the bypass line can be taken into account in the coating or in the material selection for the sleeve.

According to an embodiment, the rolling bearing with all the components mentioned so far, if necessary also in combination with one or both machine elements, is designed as a self-retaining structural unit. On the one hand, such a structural unit keeps storage and transport capacities small, and on the other hand, the effort required for mounting the rolling bearing apparatus in a vehicle transmission, an electrical machine, an electrically operated axle, or in any other arbitrary system is lower compared to the individual mounting of the components.

The rolling elements of the rolling bearings can be guided between the bearing ring with or without cage(s). A cage has one or two side edges. Cages with only one side edge are designed to be crown- and or comb-like, i.e. cage bars protrude in the axial direction from the side edge like the prongs of a crown or the teeth of a comb. The circumferentially adjacent gaps between the prongs or teeth are the pockets in which the rolling elements are received. The unwinding of the cages is formed in imaginary unwindings in flat planes for balls in the manner of a perforated strip and in a ladder-like manner for rollers. In both cases, the cage bars connect two side edges that extend parallel to one another. The gaps, which appear hole- or window-shaped in the flat planes, are pockets formed three-dimensionally in the circumferential direction between the cage bars, in which the rolling elements are received.

As previously mentioned, transmission manufacturers often fight for every millimeter of installation space. This also has an impact on the requirements placed on the rolling bearings, which consequently have to be designed to save as much axial space as possible. The aforementioned measure also helps to save on axial installation space because the retaining elements of the retaining ring overlap the bearing ring in the axial direction and radially engage behind it. For this purpose, as provided with one embodiment, a radial annular gap is formed between the bearing ring and the machine element. The retaining elements engage axially from one side of the end of the bearing ring in the annular gap formed, for example, between the outer ring and the housing. Existing installation space is utilized without having to axially extend the bearing ring for the purpose of a holding zone for fastening the bypass apparatus.

One embodiment, when using rolling bearings with cage(s), provides that at least one end of the side edge delimiting the side edge axially in the direction of the bypass line, or better still the entire side edge of the cage, extends radially between the axis of rotation and the retaining element of the bypass apparatus about the axis of rotation. In this case, the axial width of the bearing ring is generally specified only by the necessary axial installation space for the seals and rolling elements and the axial width of the side edge. The fastening for the bypass apparatus does not require any additional axial installation space. This measure is particularly effective for ball bearings in which a ball snap cage with only one side edge is used to retain the balls. The side edge extends axially on the side between the rolling elements and the bypass apparatus and radially below/inside a pitch circle on which the retaining elements rest against the outer ring extending around the axis of rotation of the rolling bearing.

The task of the main seals in rolling bearings, as mentioned at the beginning, is to seal the inside of the rolling bearing from the environment. Another task of the main seal is to keep the lubricating grease, which is vital for the functioning of the rolling bearing, in the rolling bearing. Lubricating grease has lubricating oil and grease thickener. The lubrication of the rolling contact is essentially achieved by means of the lubricating oil. The grease thickeners serve as the reservoirs for the lubricating oil and secrete this during the operation of the rolling bearing. Since the lubricating oil is relatively liquid, it may easily infiltrate the sealing lips of the main seals. In this context, the lubricating oil is transported from the zones of the rolling contact in front of the main seal into the environment of the rolling bearing and is detrimentally missing in the lubrication of the rolling bearing. A further disadvantage could arise if the lubricating oil is unintentionally transported into the intermediate space between the main seal arranged on the side of the bypass apparatus and the bypass line, as previously described. Due to the lack of a sealing function of the bypass apparatus, the lubricating oil located there could absorb and bind to the dirt particles entering the intermediate space through the recesses of the bypass apparatus. This could result in a layer of dirt in the intermediate space, the constituents of which could, over time, get under the main seal and thus into the rolling contact of the rolling bearing.

The volume of a side edge of the cage arranged on the side of the rolling elements facing the bypass apparatus occupies a large proportion of the space in the annular gap formed on this side of the rolling elements between the two bearing rings. This space is therefore hardly filled with lubricating grease, but only the region inside the rolling bearing on the side of the side edge facing away from the bypass apparatus. Accordingly, there will also be less lubricating oil on the side where the side edge of the cage extends around. The risk of lubricating oil loss on the side of the bypass apparatus is therefore positively reduced by the arrangement of the side edge on this side.

BRIEF DESCRIPTION OF THE DRAWINGS

In the following, the disclosure is explained in more detail with reference to exemplary embodiments. In the figures.

DETAILED DESCRIPTION

Figure 3:
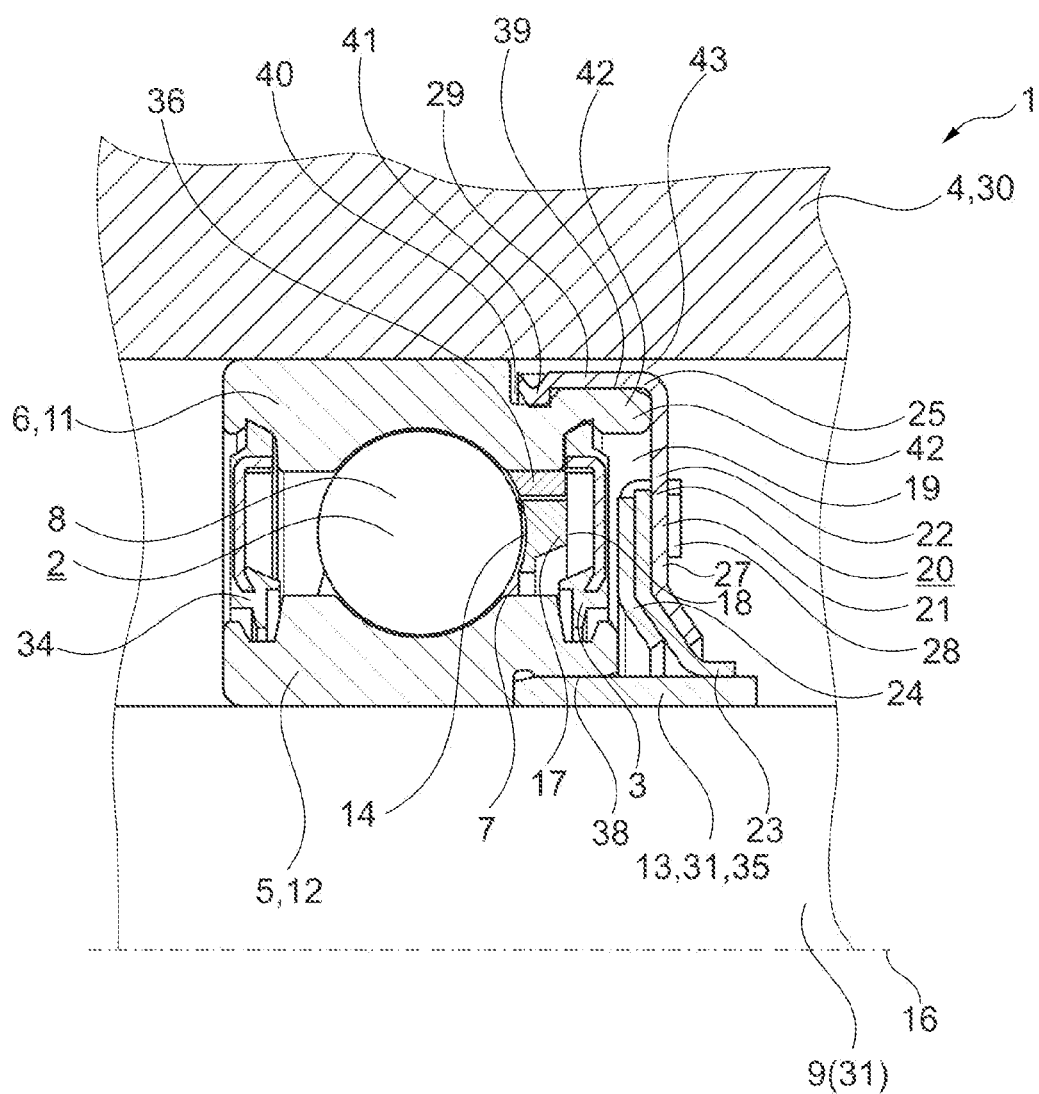
FIG. 3 shows an exemplary embodiment of a rolling bearing apparatus 1 with the rolling bearing 2 shown in FIG. 1 in a longitudinal section along the axis of rotation 16.

The following description is made with reference to FIG. 3. The rolling bearing apparatus 1 is formed by the rolling bearing 2 shown in FIG. 1, the seal 3, the seal 34 and the bypass apparatus 20 and has a first machine element 30 designed as a housing 4, a shaft 9 and a second machine element 31 designed as a sleeve 35. The shaft 9 is alternatively the second machine element 31.

Figure 1:
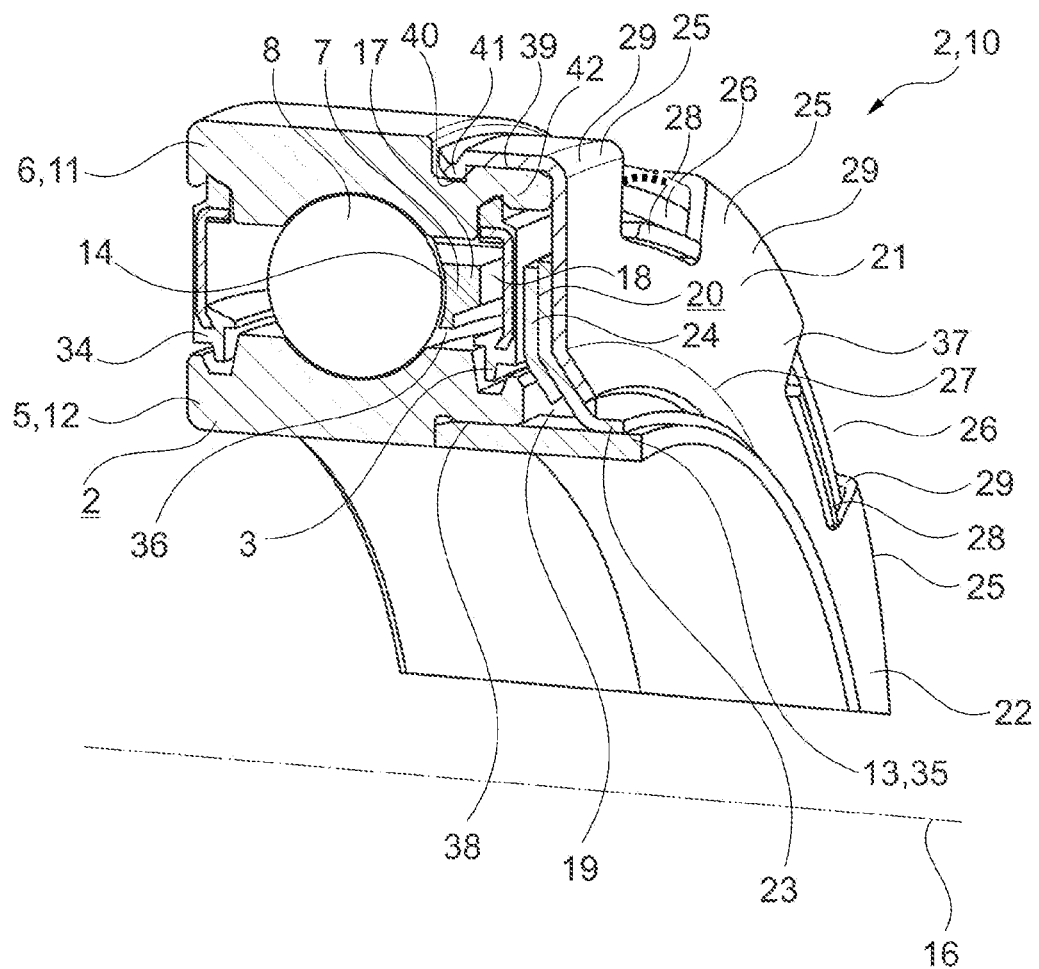
FIG. 1 shows an exemplary embodiment of a rolling bearing 2 in a partial section along the axis of rotation 16 of a spatial representation of the rolling bearing 2.

The following description is made with reference to FIGS. 1 and 3. The rolling bearing 2 has at least a first bearing ring 5 designed as an inner ring 12 and a second bearing ring 6 designed as an outer ring 11, as well as a bypass apparatus 20. The bearing rings 5 and 6 are arranged concentrically on the axis of rotation 16 of the rolling bearing 2. The rolling bearing 2 designed as a deep groove ball bearing is provided with rolling elements 8 which are arranged radially between the bearing rings 5 and 6 and which are balls. The balls are arranged in a cage 7. The cage 7 has a number of pockets 14 corresponding to the number of rolling elements 8 and a side edge 17 extending around the axis of rotation 16. In each pocket 14 sits a ball. The seals 3 and 34 designed as the main seal are inserted radially into the rolling bearing 2 between the bearing rings 5 and 6. The side edge 17 extends axially between the rolling elements 8 and the seal 3 in an annular gap 36 around the axis of rotation 16. The inner ring 12 is provided on the inside and on the side of the bypass apparatus 20 at a diameter step with an inner seat surface 38 of inner cylindrical design, on which the sleeve 35, designed as a hollow cylindrical component 13, is seated, for example held by an interference fit. The diameter step results from the fact that the diameter of the inner seat surface 38 is larger than the diameter of the inner ring 12 inside for the shaft seat.

The bypass apparatus 20 has a holder 21, a retaining washer 24, an electrically conductive bypass line 23 and the sleeve 35. Retaining elements 25 are formed on a radially extending base body 27 of a retaining ring 22 of the holder 21, of which only one retaining element 25 is visible in the illustration according to FIG. 3. The outer ring 11 is provided on the outside with a diameter step on which an outer seat surface 39 is formed. The cylindrically designed outer seat surface 39 has a diameter which is smaller than the outer diameter of the outer ring 11 for the housing seat. The outer seat surface 39 is axially adjoined by a radial indentation 40 which could consist of indentations 40 adjacent to one another on the circumferential side, but in this case is designed as an annular groove 40. Brackets 29 of the retaining elements 25 are radially resilient and are pushed onto the overhang during assembly, move elastically outward, extend axially over the outer seat surface 39 to the annular groove 40 and finally snap into the annular groove 40 with the radial projections 41, are then radially locked with the locking projections 41 in the annular groove 40, and rest radially against the outer seat surface 39 or are radially preloaded against it, for example.

An intermediate space 19 is formed axially between the disc-shaped base body 27 and the seal 3, which is delimited outwards in the radial directions on one side by an axial overhang 42 of the outer ring 11 and on the other side by a section of the sleeve 35. The bypass line 23 is axially clamped between the retaining washer 24 and a base body 27 of the retaining ring 22. The retaining washer 24 is fixed to the base body 27 by retaining clips 28. Of the retaining clips 28, only one retaining clip 28 is visible in FIG. 3 due to the sectional view. In the rolling bearing 2, there is an electrical connection between the outer ring 11 via the brackets 29 and the disc-shaped base body 27 to the bypass line 23 and from the bypass line 23 to the sleeve 35 and from the sleeve 35 to the inner ring 12.

Figure 2:
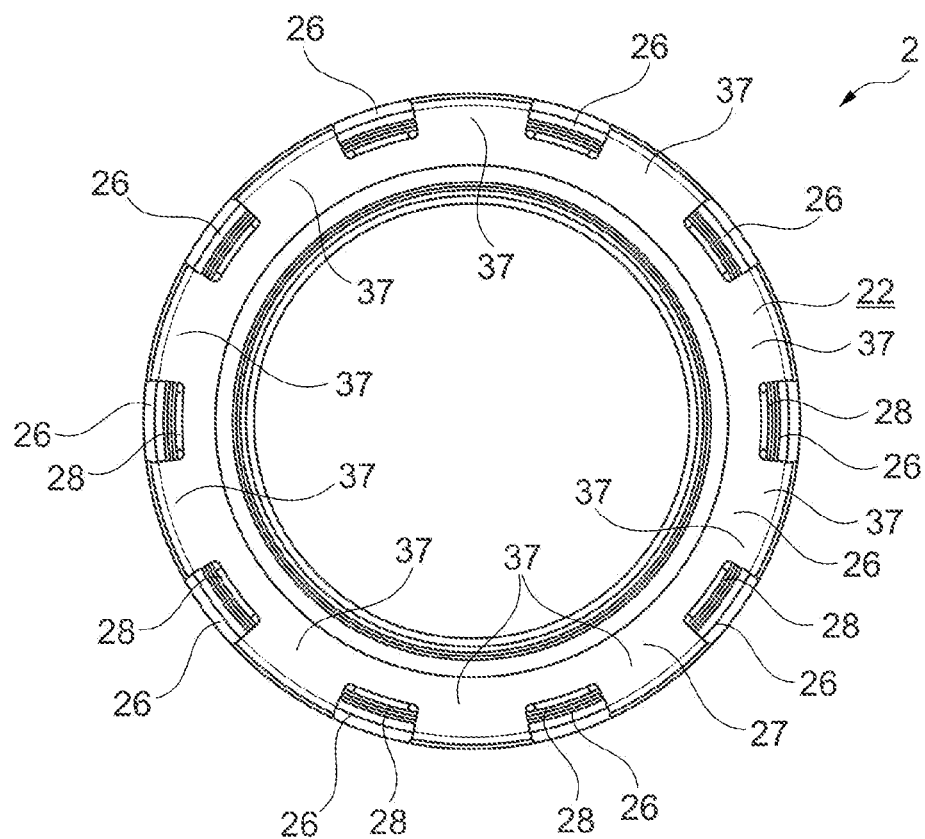
FIG. 2 shows a frontal view of the rolling bearing 2 according to FIG. 1.

The following description is made with reference to FIGS. 1 and 2. The front of the rolling bearing 2 is substantially covered from one side by the retaining ring 22. The retaining ring 22 is provided with recesses 26 passing axially therethrough in a continuous manner. In this case, the recesses 26 are open radially outward and delimited on both sides in the circumferential direction by a respective lever arm 37 of a retaining element 25 and in the radially inward direction by the base body 27 of the retaining ring 22. Alternatively, it is also possible for the recesses to be windows of a form not shown, which are also delimited radially outward by the material of the base body 27. The recesses 26 can optionally have curved contours or the rectangular contours shown. The respective retaining clip 28 engages axially through the respective recess 26 and is fastened to the retaining ring 22 in a form-fitting manner.

As shown in FIG. 1, the rolling bearing 2 is a structural unit 10 formed by the inner ring 12, the outer ring 11, the seals 3, 34, the rolling elements 8 and the cage 7, the bypass apparatus 21 and the sleeve 35, and retains the aforementioned components.

An intermediate space 19 is formed axially between the seal 3 and the bypass line 23. The intermediate space 19 is delimited axially in the one direction towards the rolling elements 18 by the seal 3 and an end face of the inner ring 12 and axially in the other direction by the retaining washer 24, sections of the base body 27 of the retaining ring 22 and the holder 21 and the bypass line 23. In the radial directions, the intermediate space 19 is delimited by a section of the sleeve 35 and an inner surface of the overhang 42 on the outer ring 11. The intermediate space is permeably connected via the recesses 26 to the environment surrounding the rolling bearing 2 outside the structural unit 10 for any media and contaminants, so that these can advantageously be exchanged unhindered via the recesses 26.

As can be seen in FIG. 3, the brackets 29 engage around the overhang 42 in an annular gap 43, which is formed radially between the overhang 42 and the inner surface of the bore of the housing 4. A gap remains between the respective bracket 29 and the housing 4, where the bracket 29 and the housing 4 are radially opposite one another without contact. However, an electrically conductive connection between the housing 4 and the bypass apparatus 20 is established via the outer ring 11. In this way, an electrical connection is formed between the first machine element 30 and the shaft 9 via the bypass apparatus 20. The electrical connection leads via the holder 21 to the bypass line 23. The bypass line 23 is in sliding contact with the hollow cylindrical component 13 and the component 13, formed as the sleeve 35, is optionally insulated from the inner ring 12 in a non-conductive manner and is in contact with the shaft 9, for example by means of an interference fit. In this case, the shaft 9 or alternatively the sleeve 35 is the second machine element 31. In an alternative other case, there is an electrically conductive connection between the sleeve 35 and the inner ring 12 and the inner ring 12 is connected to the shaft 9 in an electrically conductive manner. A radial air gap of at least the size of a clearance fit can be formed between the sleeve 35 and the shaft 9. In this case, the shaft 9 can also optionally be the second machine element 31.

Figure 7:
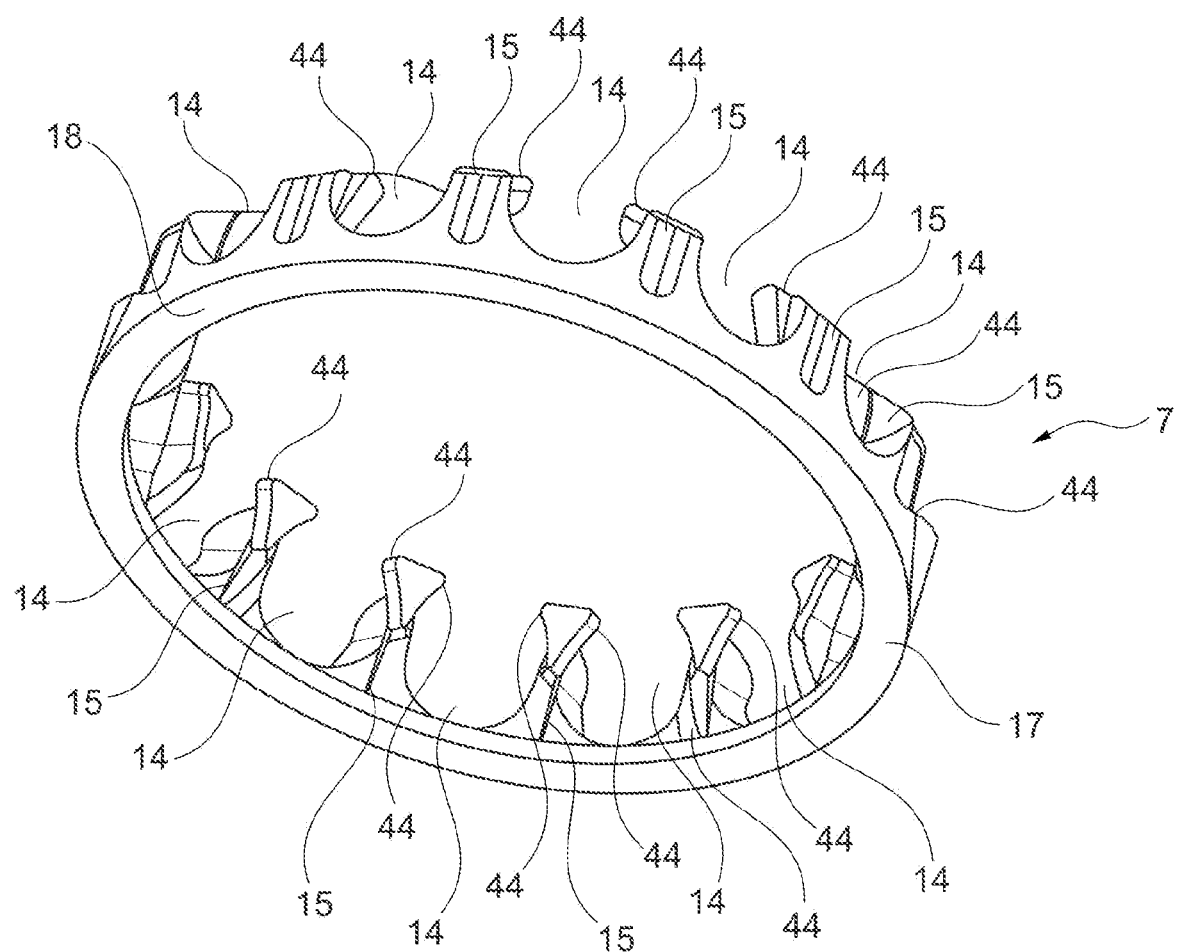
FIG. 7 shows an exemplary embodiment of a cage 7, which is installed, for example, in the rolling bearing 2 shown in FIG. 1.

The following description is made with reference to FIG. 7. The exemplary embodiment of the cage 7 is designed as a ball cage, which can be installed in a rolling bearing 2 shown in FIG. 1. The ball cage has a crown-shaped structure. The base of the cage 7 is a side edge 17 that is annular in design. On a side of the side edge 17 facing away from an axial end 18, bars 15 extend in the axial direction and project freely from the side edge 17. Each of the bars 15 has snap retainers 44 at the end on the side facing away from the side edge 17, which each project in the circumferential direction toward another snap retainer 44 of an adjacent bar 15. During assembly of the rolling bearing 2 according to FIG. 1, a ball is snapped into each of the pockets 14, which extend in an arcuate or U-shaped manner, and held in the axial direction towards one side by the snap retainers 44.

Returning to FIG. 3, the end 18 of the side edge 17, which delimits the side edge 17 axially in the direction of the bypass line 23, extends radially between the axis of rotation 16 and the retaining element 25 or radially between the bracket 29 and the inner ring 12 about the axis of rotation 16.

Figure 4:
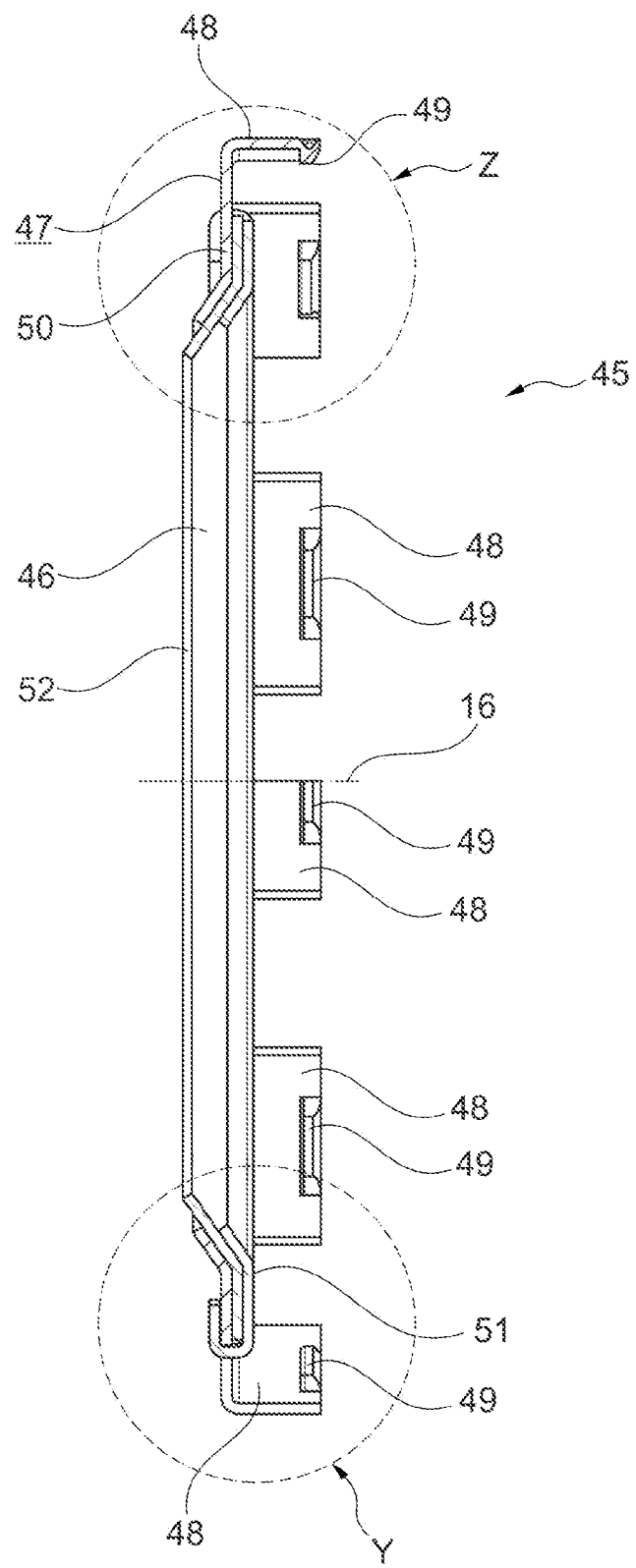
FIG. 4 shows an exemplary embodiment of a bypass apparatus 45 in a longitudinal section.

The following description is made with reference to FIG. 4. The bypass apparatus 45 consists of a bypass line 46 and a holder 47. A retaining ring 50 of the holder 47 is provided with axially extending retaining elements 48. A radial projection 49 is formed on the respective retaining element 48 for snap-mounting on a rolling bearing not shown. The holder 47 also has a retaining washer 51. The bypass line 46 is an annular disc with a through hole 52 pierced centrally through the axis of rotation 16.

Figure 5:
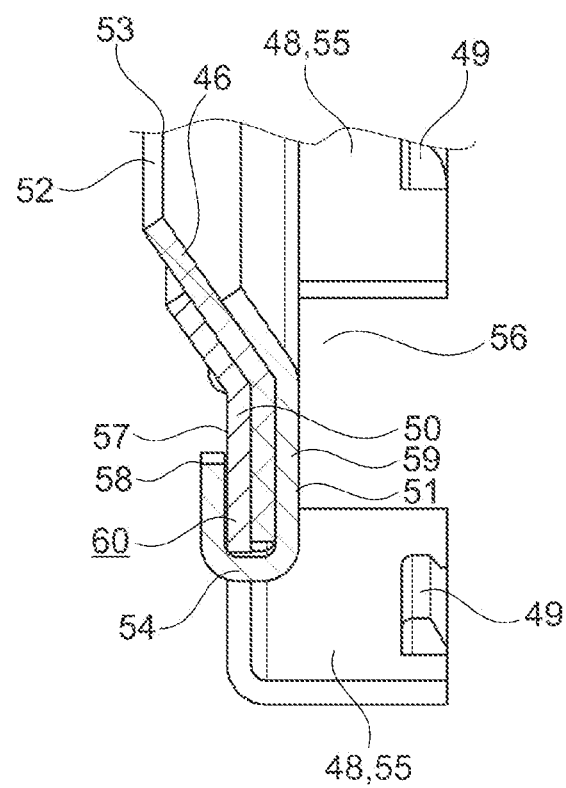
FIG. 5 shows the detail Y of the bypass apparatus shown in FIG. 4.
Figure 6:
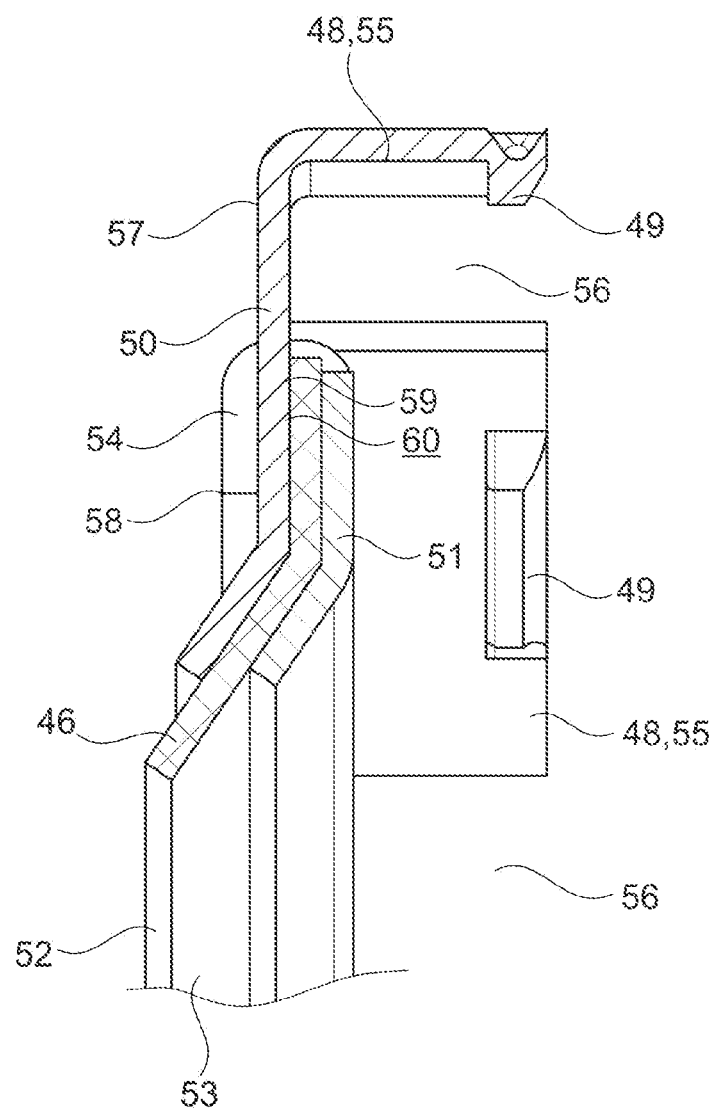
FIG. 6 shows the detail Z of the bypass apparatus shown in FIG. 4.

The following description is made with reference to FIGS. 5 and 6. The detail Y from FIG. 4 is enlarged in FIG. 5 and is not shown to scale. The detail Z from FIG. 4 is enlarged in FIG. 6 and is not shown to scale. At least the edge region 53 of the annular disc at the through hole 52 is provided for contact with a shaft not shown, alternatively an inner ring not shown or alternatively a hollow cylindrical component analogous to the component 13 shown in FIG. 1. The bypass line 46 is clamped axially between the retaining washer 51 and the retaining ring 50 and consists of a braid or fabric of current-conducting carbon fibers. The retaining elements 48 are formed in one piece and of one material with the retaining ring 50 and are elastic brackets 55, with the axially directed end of each of which the radial projection 49 is formed in one piece and of one material. The retaining elements 48 are circumferentially spaced from one another by recesses 56.

Clamping elements 54 are formed on the retaining washer 51 in one piece and of one material. The retaining washer 51 rests against the rear side of the bypass line 46 and engages axially with a clamping element 54 through one of the recesses 56. The clamping element 54 axially engages behind the retaining ring 50 at the front side 57 of the retaining ring 50 and axially rests against the front side 57 of the retaining ring 50 with its radial end 58. The retaining washer 51 on the rear side 59 of the retaining ring 50 and the clamping element 54 on the front side 57 of the retaining ring 50 form a form-fitting and non-releasable clamping connection 60 between the retaining ring 50, the bypass line 46 and the retaining washer 51. The retaining ring 50 and retaining washer 51 are components cut from sheet metal and cold formed.

REFERENCE NUMERALS

1 Rolling bearing apparatus
2 Rolling bearing
3 Seal
4 Housing
5 First bearing ring
6 Second bearing ring
7 Cage
8 Rolling element
9 Shaft
10 Structural unit
11 Outer ring
12 Inner ring
13 Hollow cylindrical component
14 Pocket of the cage
15 Bar of the cage
16 Axis of rotation of the rolling bearing
17 Side edge
18 Axial end of the side edge
19 Intermediate space
20 Bypass apparatus
21 Holder of the bypass apparatus
22 Retaining ring
23 Bypass line
24 Retaining washer
25 Retaining element
26 Recess
27 Base body of the holder
28 Retaining clip
29 Bracket
30 First machine element
31 Second machine element
32 Clamping element 33 Annular gap
34 Seal
35 Sleeve
36 Annular gap
37 Lever arm
38 Inner seat surface
39 Outer seat surface
40 Radial indentation, annular groove
41 Radial projections
42 Overhang
43 Annular gap
44 Snap retainer of the cage
45 Bypass apparatus
46 Bypass line
47 Holder of the bypass apparatus
48 Retaining element
49 Radial projection of the retaining element
50 Retaining ring
51 Retaining washer
52 Through hole
53 Edge region of the through hole
54 Clamping element
55 Bracket
56 Recess
57 Front side of the retaining ring
58 End of the clamping element
59 Rear side of the retaining ring
60 Clamping connection

The invention claimed is:

1. A rolling bearing apparatus comprising:
a rolling bearing comprising:
a first bearing ring,
a second bearing, the bearing rings concentrically arranged on an axially aligned axis of rotation of the rolling bearing, and
rolling elements arranged radially between the bearing rings, and
a seal arranged radially between the bearing rings,
a bypass apparatus forming an electrical connection between a first machine element and a second machine element, the bypass apparatus comprising:
a holder having:
a retaining ring comprising a radial base body and a recess extending axially through the radial base body in a continuous manner, and
a retaining washer comprising a retaining clip engaged in the recess to hold the retaining washer on the radial base body, and
an electrically conductive bypass line forming an electrical connection between the first machine element and the second machine element, the electrically conductive bypass line held axially between: i) the retaining ring and the retaining washer, or ii) between the retaining clip and the retaining ring, and
the holder and the electrically conductive bypass line are connected to one another in an electrically conductive manner, and
the holder is fastened to one of the bearing rings and holds the electrically conductive bypass line, and
one of the bearing rings is fastened to one of the machine elements.

2. The rolling bearing apparatus according to claim 1, wherein:
the retaining ring further comprises a retaining element extending axially in a same direction as the axis of rotation between a housing and one of the bearing rings,
the retaining ring is electrically conductive,
the retaining element is external to the retaining ring, and
the holder is held by the retaining element on one of the bearing rings.

3. The rolling bearing apparatus according to claim 2, wherein:
the retaining element further comprises brackets distributed on a circumference of one of the bearing rings,
the brackets are radially preloaded between one of the machine elements and one of the bearing rings radially against one of the bearing rings,
the holder is electrically conductive,
a recess extending axially through the holder in a continuous manner and spacing two adjacent ones of the brackets from one another in a circumferential direction, and
a retaining clip or a clamping element engages in a form-fitting manner in the recess.

4. The rolling bearing apparatus according to claim 2 wherein:
the rolling elements are held with a cage between the bearing rings,
the cage has a plurality of pockets for receiving the rolling elements, which pockets are distributed in a circumferential direction of the cage and are separated from one another in the circumferential direction about the axis of rotation by cage bars extending transversely to the circumferential direction,
the cage bars are connected to one another by a side edge, and
an end of the side edge axially delimiting the side edge in a direction of the electrically conductive bypass line extends radially between the axis of rotation and the retaining element about the axis of rotation.

5. The rolling bearing apparatus according to claim 2, wherein:
an annular gap is formed between the second bearing ring and the first machine element,
the second bearing ring is seated in contact with the first machine element in the first machine element, and
the retaining element extends axially into the annular gap.

6. The rolling bearing apparatus according to claim 1, wherein:
one of the bearing rings contacts the first machine element in an electrically conductive manner, and
the bypass line contacts the second machine element in an electrically conductive manner.

7. The rolling bearing apparatus according to claim 1, wherein:
the first machine element is a housing; and
one of the bearing rings is an outer ring of the rolling bearing seated in the housing.

8. The rolling bearing apparatus according to claim 1, wherein:
the second machine element is a hollow cylindrical component,
the hollow cylindrical component is part of the bypass apparatus,
one of the bearing rings is formed as an inner ring, and
the hollow cylindrical component is connected to the inner ring.

9. The rolling bearing apparatus according to claim 1, wherein the second machine element is the second bearing ring formed as an inner ring.

10. The rolling bearing apparatus according to claim 1, further comprising:
a self-retaining structural unit comprising:
the rolling bearing,
the seal, and
the bypass apparatus,
the second machine element is a hollow cylindrical component connected to the first bearing ring,
the first bearing ring is formed as an inner ring, and
the self-retaining structural unit further comprises the hollow cylindrical component.

11. The rolling bearing apparatus according to claim 1, wherein:
an intermediate space delimited at least by the seal and the bypass apparatus is formed axially between the seal and the electrically conductive bypass line, and
the intermediate space is connected via a recess to an environment surrounding the rolling bearing apparatus in a manner permeable for any media and solids.

12. The rolling bearing apparatus according to claim 1, wherein:
the electrically conductive bypass line comprises a structure having conductive fibers, and
the bypass apparatus or the electrically conductive bypass line has an electrical resistance lower than or equal to 100 ohms.

13. A rolling bearing apparatus comprising:
a rolling bearing comprising:
an axis of rotation;
a first bearing ring and a second bearing ring, the first bearing ring and the second bearing ring being concentrically arranged on the axis of rotation; and
rolling elements arranged radially between the first bearing ring and the second bearing ring;
a seal arranged radially between the first bearing ring and the second bearing ring;
a first machine element and a second machine element, the second bearing ring being installed in the first machine element; and
a bypass apparatus forming an electrical connection between the first machine element and the second machine element, the bypass apparatus comprising:
an electrically conductive bypass line; and
a holder:
comprising: i) a retaining ring having an axially extending external retaining element fastened to the second bearing ring, and ii) a retaining washer;
connected to the electrically conductive bypass line in an electrically conductive manner, and
fastened to the second bearing ring radially between the second bearing ring and the first machine element; and
the electrically conductive bypass line is held axially between the retaining ring and the retaining washer.

14. The rolling bearing apparatus of claim 13, wherein:
the axially extending external retaining element comprises a pair of brackets circumferentially distributed on a circumference of the second bearing ring, each one of the pair of brackets being radially preloaded against the second bearing ring;
the holder comprises a recess formed between the pair of brackets;
a retaining clip or a clamping element is engaged with the recess in a form-fitting manner; and
the electrically conductive bypass line is clamped axially between:
the retaining washer and the holder; or
the clamping element and the holder
by the retaining clip or the clamping element.

15. The rolling bearing apparatus of claim 13 wherein:
the second bearing ring contacts the first machine element in an electrically conductive manner; and
the electrically conductive bypass line contacts the second machine element in an electrically conductive manner.

16. A rolling bearing apparatus comprising:
a rolling bearing comprising:
an axis of rotation;
a first bearing ring and a second bearing ring, the first bearing ring and the second bearing ring being concentrically arranged on the axis of rotation; and
rolling elements arranged radially between the first bearing ring and the second bearing ring;
a seal arranged radially between the first bearing ring and the second bearing ring;
a first machine element and a second machine element, the second bearing ring being installed in the first machine element; and
a bypass apparatus forming an electrical connection between the first machine element and the second machine element, the bypass apparatus comprising:
an electrically conductive bypass line; and
a holder connected to the electrically conductive bypass line in an electrically conductive manner, the holder being fastened to the second bearing ring radially between the second bearing ring and the first machine element; and
the holder comprises a retaining ring and a retaining washer;
the retaining ring comprises a radial base body and a recess extending axially through the radial base body;
the retaining washer comprises a retaining clip engaged in the recess and held on the radial base body; and
the electrically conductive bypass line is held axially between:
the retaining ring and the retaining washer; or
the retaining clip and the retaining ring.

* * * * *